United States Patent
Knight

[15] 3,668,846
[45] June 13, 1972

[54] QUICK DUMP GRASS CATCHER FOR LAWN MOWER

[72] Inventor: Warner P. Knight, 1301 Thomas Place, Fort Worth, Tex. 76107

[22] Filed: May 12, 1971

[21] Appl. No.: 142,463

[52] U.S. Cl. ............................................................56/205
[51] Int. Cl. ......................................................A01d 35/22
[58] Field of Search....................56/202, 203, 204, 205, 206, 56/199, 200, 13.4, 17.5

[56] References Cited

UNITED STATES PATENTS

| | | |
|---|---|---|
| 2,910,818 | 11/1959 | Beal et al. ..............................56/320.2 |
| 3,065,588 | 11/1962 | Shaw ........................................56/13.4 |
| 3,108,420 | 10/1963 | Geroke.....................................56/205 |
| 3,191,370 | 6/1965 | Epstein.....................................56/202 |
| 3,193,997 | 7/1965 | Allina.......................................56/202 |

*Primary Examiner*—Russell R. Kinsey
*Attorney*—J. Bruce Synnott, Jr.

[57] ABSTRACT

A grass catcher for use with a power driven lawn mower having a grass discharge duct which terminates on one side of the mower, and is arranged to discharge grass cuttings in an upward and rearward direction, in admixture with a stream of air, and having a pair of elongated handles which are inclined upwardly and rearwardly, in parallel, spaced apart relation to each other, and a cross bar extending between the handles, forwardly thereof, the cross bar being bent right angularly intermediate its ends and having end portions which are perpendicular to its intermediate portion and which extend upwardly, perpendicular to the handles. Comprises an elongated, substantially six sided box, formed of sheet metal, which has generally parallel sides and ends, and has a height greater than its width and a length greater than its height, which in use is arranged substantially horizontally between the upwardly and rearwardly inclined handles, rearwardly of the cross bar, and extends above and below the handles. The box has means whereby it is loosely supported on the handles, and on the cross bar, and is secured by its own weight. It has a grass inlet on its front end which in its operative position loosely surrounds the opposing end of the grass discharge duct, and has air vents on its two opposite sides, near the top thereof. The back end of the box is hinged at the top whereby it may be swung open, for convenience in dumping the contents of the box. The box has handles on the top thereof for lifting it in and out of engagement with the mower, and for dumping.

5 Claims, 6 Drawing Figures

Warner P. Knight
INVENTOR

BY
ATTORNEY

Warner P. Knight
INVENTOR.

BY
ATTORNEY

QUICK DUMP GRASS CATCHER FOR LAWN MOWER

This invention relates to a quick dump grass catcher for a lawn mower, and it concerns more particularly an improved grass catcher for use with a particular type of lawn mower as hereinafter described.

The grass catcher of the invention is designed for use specifically with a power driven lawn mower having a grass discharge duct which terminates on one side of the mower, and is arranged to discharge grass cuttings in an upward and rearward direction, in admixture with a stream of air, and having a pair of elongated handles which are inclined upwardly and rearwardly, in parallel, spaced apart relation to each other, and a cross bar extending between the handles, forwardly thereof, the cross bar being bent right angularly intermediate its ends and having end portions which are perpendicular to its intermediate portion and which extend upwardly, perpendicular to the handles.

Lawn mowers substantially as described, and which also have a second cross bar extending between the handles, rearwardly thereof, are made by McDonough Power Equipment, Inc., McDonough, Georgia, for example.

A grass catcher which is commonly used with lawn mowers as described comprises a shaped, flexible, inflatable bag, formed of cotton-nylon fabric, which is arranged between the handles of the mower and secured at its ends to the cross bars, by tying. The bag has a grass inlet which is secured by elastic means around the grass discharge of the mower, and has a bottom flap at the rear which is secured by buttons, for use in dumping the contents of the bag.

In practice the cloth bags above described quickly wear out. They do not have air vents, although they are not air tight, and in use the grass inlet, which is of reduced cross sectional area, becomes choked with grass. The bags must be removed from the mower to dump them effectively, and to positively remove all of the grass therefrom, and it is inconvenient to do so, because the bags are secured in place by tying, so that dumping the bags often is deferred longer than it should be. As the bags become filled with grass the flow of additional cuttings into the them from the mower is resisted.

The grass catcher of this invention is an elongated, substantially six sided box, formed of sheet metal, which has generally parallel sides and ends, and has a height greater than its width and a length greater than its height, which in use is arranged substantially horizontally between the upwardly and rearwardly inclined handles, rearwardly of the front cross bar, and extends above and below the handles.

The box which comprises the grass catcher has means whereby it is loosely supported on the handles, and on the front cross bar, and is secured by its own weight. The box has a grass inlet on its front end which in its operative position loosely surrounds the opposing end of the grass discharge duct, and has air vents on its two opposite sides, near the top thereof.

The back end of the box is hinged at the top whereby it may be swung open, for convenience in dumping the contents of the box, and the box has handles on the top thereof for lifting it in and out of engagement with the mower, and for dumping.

The invention will be readily understood by referring to the following description and the accompanying drawing, in which.

Figure 1:
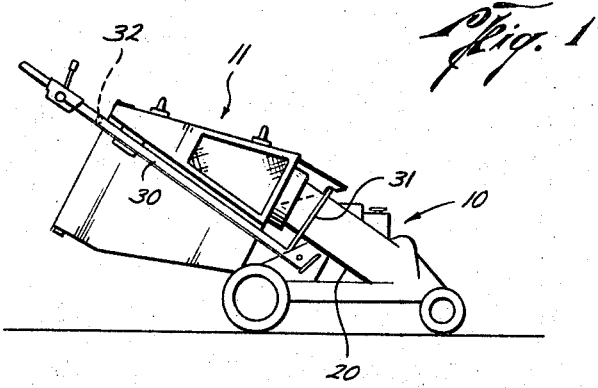
FIG. 1 is a side elevational view of a lawn mower having a quick dump grass catcher embodying the invention in place.
Figure 3:
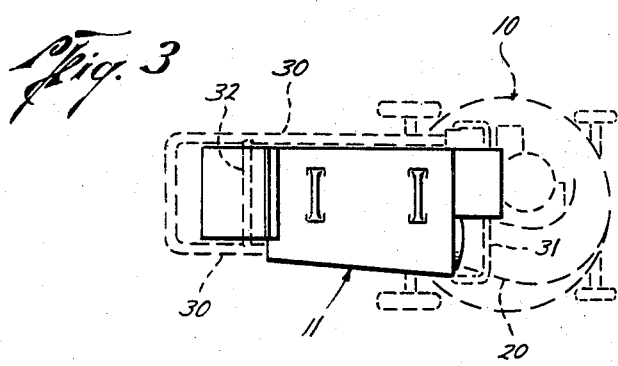
FIG. 3 is a top plan view of the grass catcher and the mower, showing the mower in broken lines.

Referring to FIGS. 1 and 3 of the drawing, the numeral 10 designates generally a lawn mower, shown in broken lines in FIG. 3, which as illustrated is a power driven rotary mower as hereinafter more fully described, and the numeral 11 indicates generally a quick dump grass catcher embodying the invention, also as hereinafter described, shown in place on the mower.

The mower 10, which is characterized by its rear discharge, has a discharge duct 20 which terminates on the right side of the mower, relative to the direction of movement of the mower in a forward direction, and is arranged to discharge grass cuttings in an upward and rearward direction, and at high velocity, due to suction created by the action of the mower.

The mower 10 has a pair of elongated handles 30 which are inclined upwardly and rearwardly, in parallel, spaced apart relation to each other, and are connected at their outer ends. A first cross bar 31 and a second cross bar 32 extend between the handles 30, forwardly and rearwardly thereof.

The front cross bar 31 is bent right angularly intermediate its ends, and has end portions which are perpendicular to its intermediate portion and which extend upwardly, perpendicular to the handles 30.

The grass catcher 11 is an elongated, substantially six sided box, formed of sheet metal, having generally parallel sides and ends but which is not necessarily rectangular, and having a height greater than its width and a length greater than its height.

The sheet metal box which comprises the grass catcher 11 is arranged substantially horizontally between the upwardly and rearwardly inclined handles 30 of the mower 10, and between the front and rear cross bars 31, 32, and extends upwardly above the handles 30 and downwardly below them.

The grass catcher 11 is loosely supported on the handles 30, and on the front cross bar 31, and is secured by its own weight, as hereinafter described.

The grass catcher 11 has a pair of laterally extending projections 40 on opposite sides of the box, rearwardly thereof, which overlie the respective handles 30, and has a forwardly extending projection 41 on the front end of the box which overlies the front cross bar 31 and has abutments thereon for engagement with the front cross bar 31 to prevent forward displacement of the grass catcher 11 relative to the upwardly and rearwardly inclined handles 30.

Figure 2:
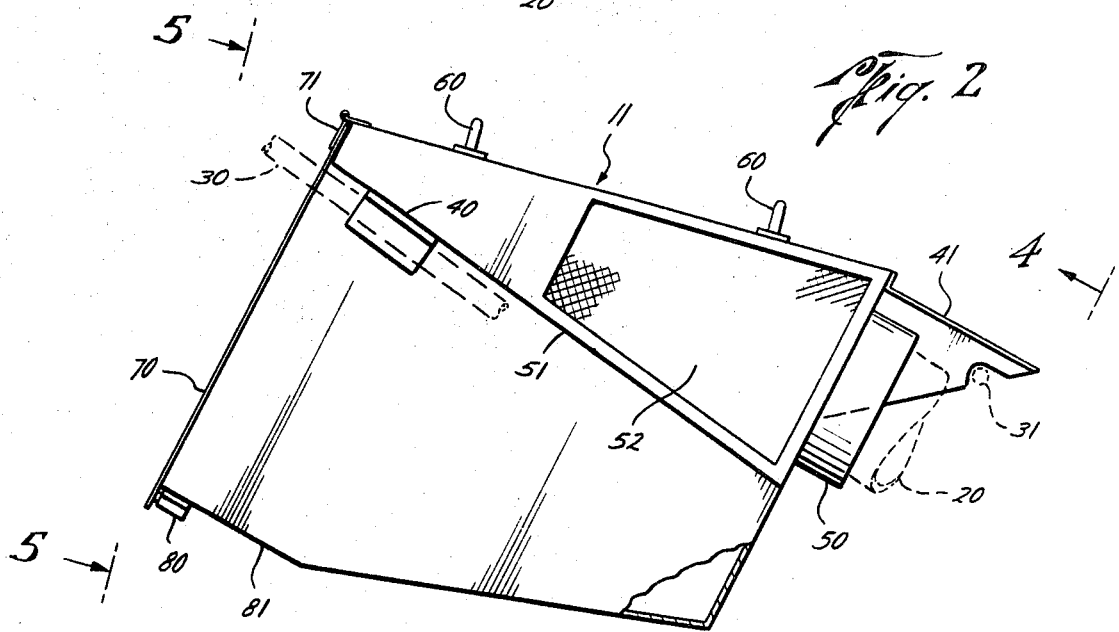
FIG. 2 is a side elevational view on an enlarged scale, partly broken away, showing the grass catcher substantially as illustrated in FIG. 1, showing related portions of the mower in broken lines.
Figure 4:
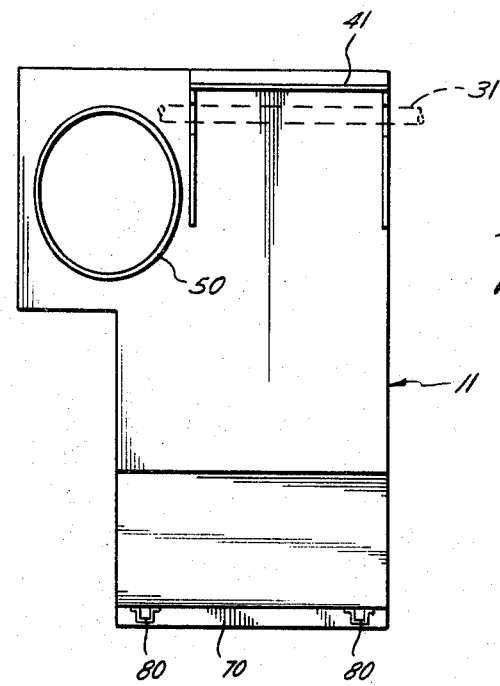
FIG. 4 is a front view of the grass catcher taken on the line 4—4 of FIG. 2.
Figure 5:
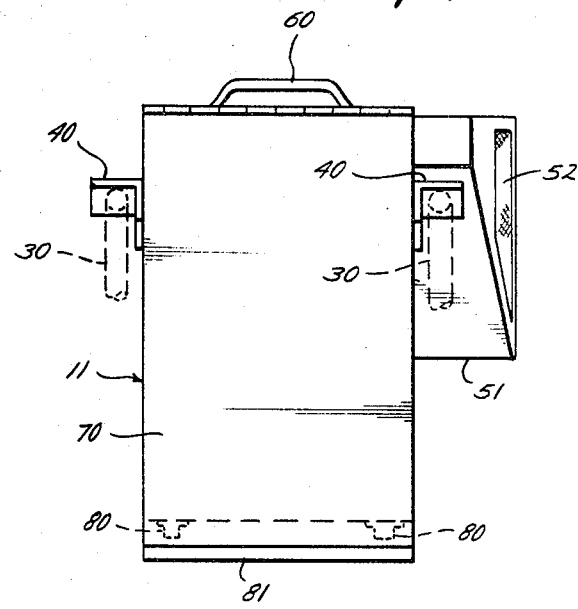
FIG. 5 is a rear view of the grass catcher taken on the line 5—5 of FIG. 2.

Referring now to FIGS. 2, 4, and 5 of the drawing, the grass catcher 11 has a grass inlet 50 on its front end which loosely surrounds the opposing end of the discharge duct 20 of the mower 10, in fluid communication therewith.

The discharge duct 20, which terminates on the right side of the mower 10, extends slightly to the right of the corresponding handle 30, and above it, and the grass inlet 50 of the grass catcher 11 is similarly positioned.

To accommodate the grass inlet 50 a lateral enlargement is provided on the right side of the grass catcher 11, at the top thereof, as at 51. The enlargement 51, which is in fluid communication with the grass inlet 50, and which is of progressively reduced dimension in a rearward direction, overhangs the corresponding handle 30.

A pair of screened windows 52 are provided in opposite sides of the grass catcher 11, near the top thereof, to permit the free flow of air therefrom, as grass in admixture with a stream of air is supplied thereto from the mower 10.

Figure 6:
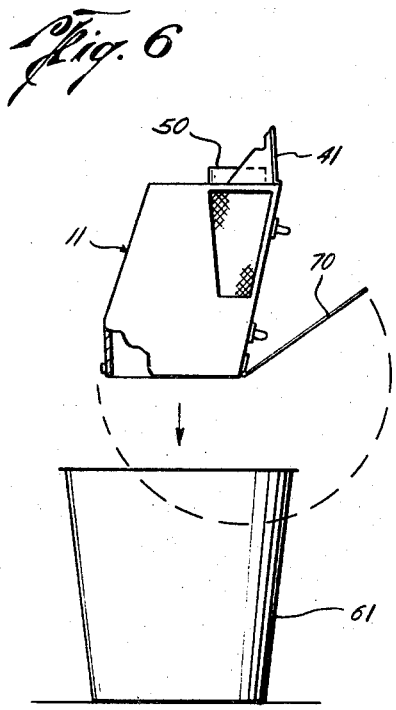
FIG. 6 illustrates how the grass catcher is dumped.

A pair of handles 60 are provided on top of the grass catcher 11 for lifting it in and out of engagement with the mower 10, and for dumping its contents, as illustrated in FIG. 6 of the drawing.

A suitable receptacle for grass dumped from the grass catcher 11, shown in FIG. 6, is indicated by the numeral 61.

As shown in FIGS. 2 and 6, the back end of the grass catcher 11, indicated by the numeral 70, is hinged at the top, as at 71, whereby it may be swung outwardly, rearwardly and upwardly, for use in dumping grass therefrom.

The hinged back end 70 of the grass catcher 11 extends downwardly below the bottom thereof for engagement by a magnet 80 on the under side thereof, two of which are shown, whereby it is normally secured in its closed position.

The rearward portion of the bottom of the grass catcher 11, which is positioned nearest the ground, is inclined upwardly, as at 81, to prevent it from dragging, as when the mower 10 is tilted.

The invention may be modified in various ways without departing from the spirit and scope thereof.

I claim:

1. A grass catcher for use with a power driven lawn mower having a grass discharge duct which terminates on one side of the mower, and is arranged to discharge grass cuttings in an upward and rearward direction, in admixture with a stream of air, and having a pair of elongated handles which are inclined upwardly and rearwardly, in parallel, spaced apart relation to each other, and a cross bar extending between the handles, forwardly thereof, the cross bar being bent right angularly intermediate its ends and having end portions which are perpendicular to its intermediate portion and which extend upwardly, perpendicular to the handles, comprising an elongated, substantially six sided box, formed of sheet metal, having generally parallel sides and ends, and having a height greater than its width and a length greater than its height, which in use is arranged substantially horizontally between the upwardly and rearwardly inclined handles, rearwardly of the cross bar, and extends above and below the handles, the box having means whereby it is loosely supported on the handles, and on the cross bar, and is secured by its own weight, the box having a grass inlet on its front end which in its operative position loosely surrounds the opposing end of the grass discharge duct, and having air vents on its two opposite sides, near the top thereof, the back end of the box being hinged at the top whereby it may be swung open, for convenience in dumping the contents of the box, and the box having handles on the top thereof for lifting it in and out of engagement with the mower, and for dumping.

2. The structure of claim 1, the means whereby the box is loosely supported on the handles, and on the cross bar, and is secured by its own weight, consisting of a pair of laterally extending projections on opposite sides of the box, rearwardly thereof, for overlying engagement with the respective handles, and a forwardly extending projection on the front end of the box for overlying engagement with the cross bar, and having abutments thereon for engagement with the cross bar to prevent forward displacement of the grass catcher relative to the upwardly and rearwardly inclined handles.

3. The structure of claim 1, the box having a lateral enlargement on one side thereof to accommodate the grass inlet, the enlargement being in fluid communication with the grass inlet, and being of progressively reduced dimension in a rearward direction, and the enlargement, in use, overhanging the corresponding handle.

4. The structure of claim 1, the hinged back end of the box extending downwardly below the bottom thereof, and the box having a magnet on the under side of the bottom thereof acting on the hinged back end of the box whereby it is normally secured in its closed position.

5. The structure of claim 4, the rearward portion of the bottom of the box, which is positioned nearest the ground, being inclined upwardly to prevent it from dragging, as when the mower is tilted.

* * * * *